Aug. 3, 1948.　　　　　P. R. HART　　　　　2,446,282
FISHING ROD HOLDER
Filed July 8, 1946　　　　　3 Sheets-Sheet 2
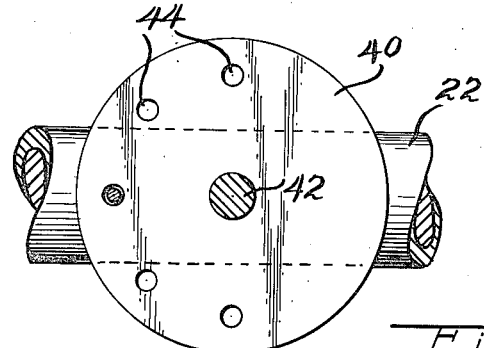
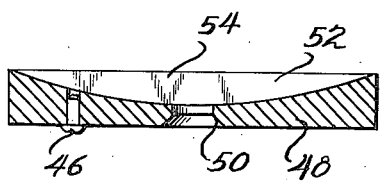
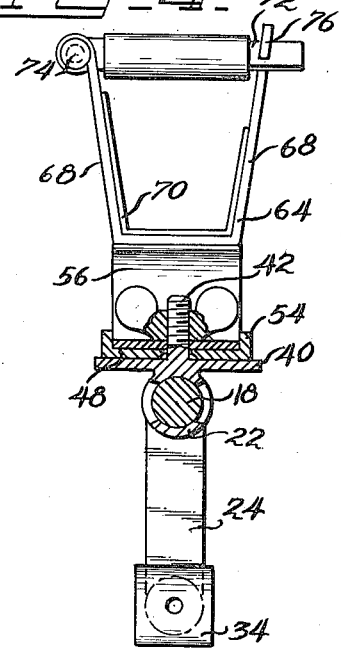
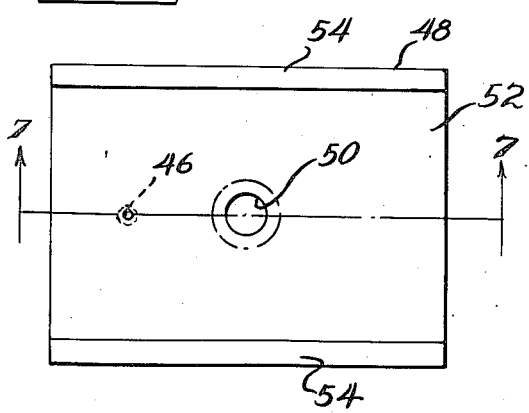
Inventor
Philip R. Hart
By Clarence A. O'Brien
and Harvey B. Jacobson
Attorneys

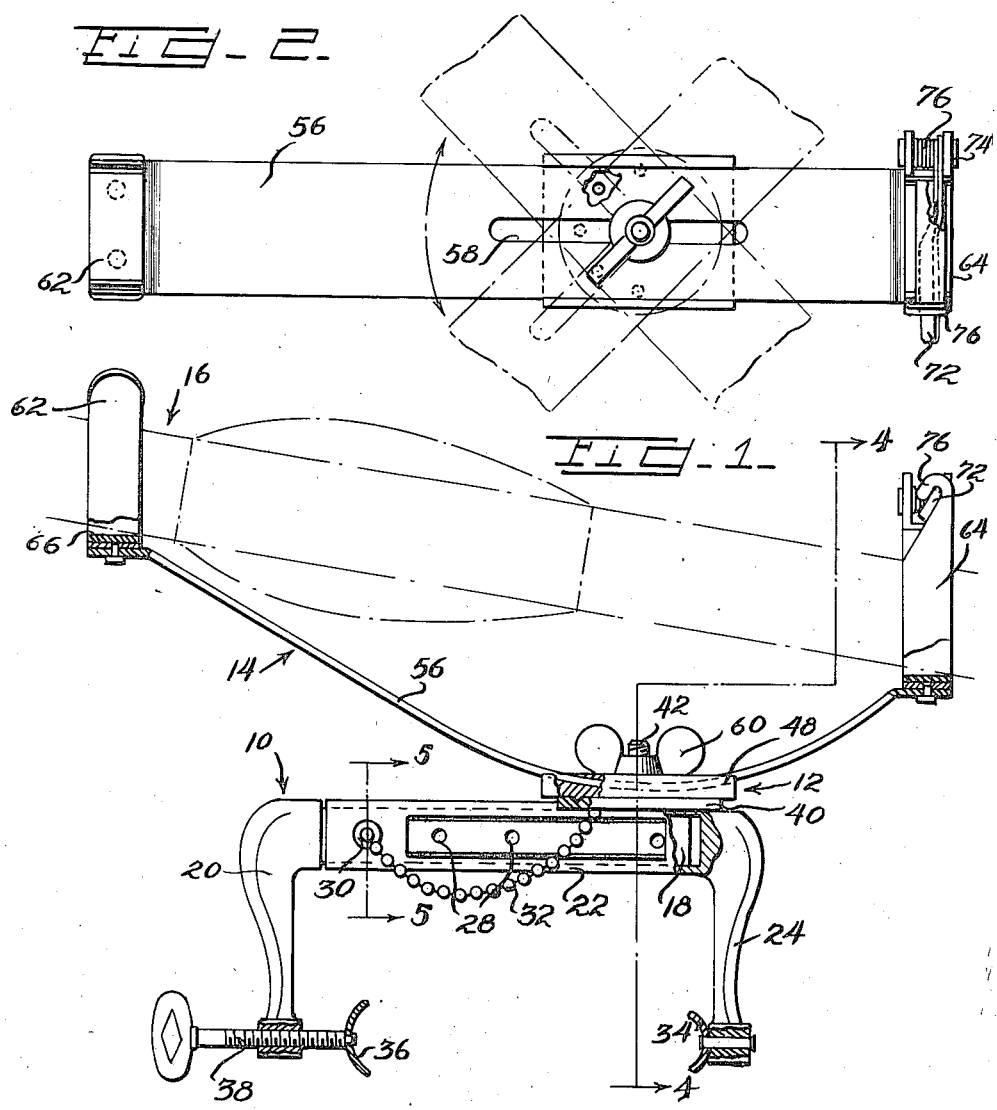

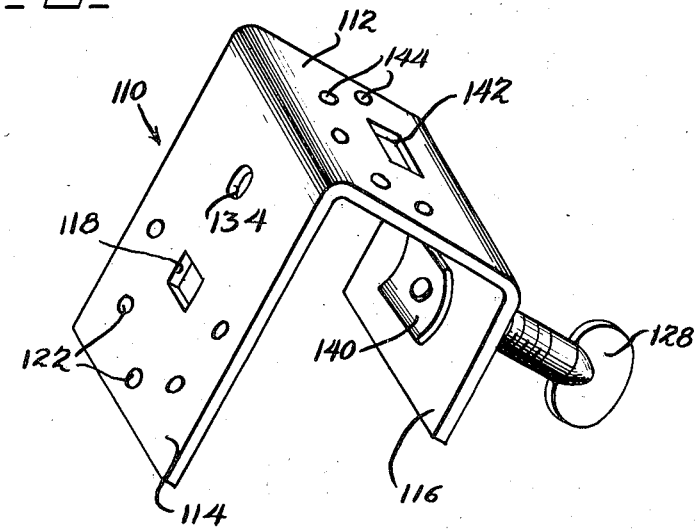
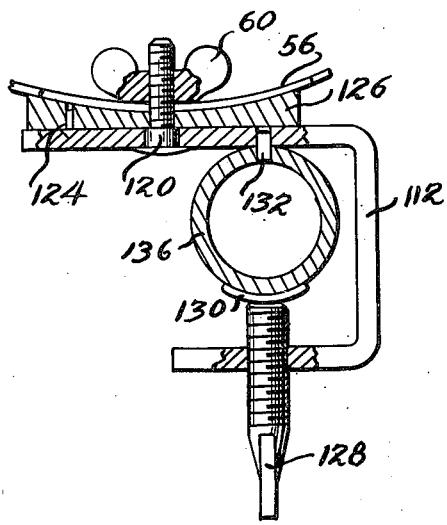
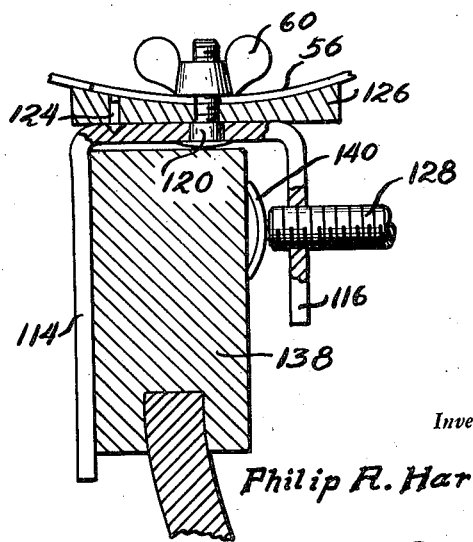

Patented Aug. 3, 1948

2,446,282

UNITED STATES PATENT OFFICE 2,446,282

FISHING ROD HOLDER

Philip R. Hart, Alameda, Calif., assignor of one-half to Axel Nelson, Alameda, Calif.

Application July 8, 1946, Serial No. 681,978

4 Claims. (Cl. 248—42)

My invention pertains to novel and useful improvements in a fishing rod holder and more generally relates to an improved holding or supporting means for expeditiously clamping and mounting a rod in any desired position of adjustment.

The primary purposes of this invention are to provide a bracket attachment for supporting a rod for complete rotation and adjustment in a horizontal plane and for varying its inclination in the vertical plane; to provide a bracket which is extensible for engagement within a wide range of mountings and which is readily adjusted to any desired extent and to provide an attachment having novel, dependable and expeditiously manipulated clamping means for carrying a rod.

These, with various subordinate objects which will later become apparent, are realized by this invention, in which the accompanying drawings and following description are to be considered as illustrative only, and wherein:

Figure 1 is a view in side elevation of the invention, parts being shown in section;

Figure 2 is a top plan view of the invention, showing various positions of adjustment;

Figure 3 is a fragmentary detail view, showing an element of the invention in top plan view;

Figure 4 is a detailed view being taken in vertical section substantially upon the line 4—4 of Figure 1;

Figure 5 is a detailed view in vertical section and is taken substantially upon the line 5—5 of Figure 1;

Figure 6 is a detailed view of another element, being shown in top plan view;

Figure 7 is a vertical sectional view being taken substantially upon the line 7—7 of Figure 6;

Figure 8 is a perspective view of a modified form of clamp adapted for use with the invention;

Figure 9 is a side elevational view, partly in section, of the modified clamp of Figure 8, showing its manner of incorporation into the assembly; and Figure 10 is a side elevational view, partly in section, similar to Figure 9 but illustrating the same clamp employed in alternative mode of use.

In the accompanying drawings, attention is first directed to Figures 1 and 2, wherein 10 denotes generally a clamp in accordance with the principles of this invention, to which is attached a swivelling means indicated generally at 12, and adjustably supporting a rod support 14 within which is detachably seated a rod indicated diagrammatically at 16. As shown best in Figure 1, the clamp 10 is composed of a shaft 18 which is preferably of tubular construction and carries at one end thereof a depending arm or jaw 20, which shaft is slidably received in a telescopic manner within a tubular shaft 22 which likewise carries a depending jaw or arm 24 at one end thereof. The shafts 18 and 22 are provided with series of aligned apertures or bores 26 and 28 respectively which may be aligned in varied positions of axial adjustment of the shafts 18 and 22. A slightly tapering retaining pin 30 which is secured to the clamp by a ball chain 32 is intended to maintain the telescopic parts in adjusted relation, by engagement with aligned apertures 26 and 28 of the telescopic members. The outer extremities of the jaws 20 and 24 are provided with arcuate plates 36 and 34 respectively which are adapted to grip or embrace a rail or similar support therebetween for the purpose of rigidly mounting the clamp thereon. As shown in Figure 1, the member 34 is fixedly carried by the jaw 24, while member 36 is relatively adjustable in the jaw 20 by means of the thumb screw 38. From the foregoing, it will be readily seen that the members 34 and 36 may be properly adjusted to firmly grip a rail or like object therebetween, while the telescopic members 18 and 22 may be longitudinally extended to accommodate themselves to wide variations in the dimensions of the supporting rail.

Attention is now directed to the swivelling means shown more clearly in Figures 1, 3–7. The upper surface of the tubular member 22 is enlarged to form a circular, planar boss 40 having a vertically disposed screw threaded extension 42 extending centrally thereof. As shown more clearly in Figure 3, the upper surface of the plate 40 is provided with a series of angularly disposed depressions 44 adapted for selective engagement by a depending projection 46 carried by a rectangularly shaped top plate 48 which is centrally apertured at 50 to receive the screw threaded stud 42 therethrough. As the plate 48 is rotated about the stud 42, the detent 46 will be selectively engaged in one of the depressions 44 for the purpose of maintaining the swivelling members 48 and 40 in predetermined selected positions.

Attention is now directed to Figures 1, 6 and 7, wherein it may be seen that the top plate 48 is provided with a longitudinally extending guide groove or channel 52 having side walls or ribs 54 and having its bottom surface arcuately curved as shown in Figure 7.

Adjustably seated in the channel 52 is the base 56 of the rod support 14. The base 56 is formed as an elongated strap having an arcuately disposed portion of substantially the same curvature as the bottom of the arcuate channel 52. This base member is centrally longitudinally slotted at 58 to slidably receive the threaded stud 42 therein. A suitable wing nut 60 is engagable upon the stud 42, for the purpose of simultaneously locking the support base 56 to the top plate 48, and the latter by means of cooperating detent 46 and depressions 44, to the base plate 40, carried upon the bracket 10. The opposite extremities of the support base 56 have rigidly secured thereto upstanding yoke members 62 and 64 respectively. The yoke member 62 is substantially U-shaped and is provided with a resilient bolt or pad 66 at the base thereof for supporting, without marring the surface thereof, the butt end of a rod or pole indicated at 16. The yoke member 64 is formed with upwardly and outwardly flaring arms 68, and is lined with a padding 70 of suitable cushioning material. Upon one arm is pivoted the latch member 72 as at 74, while the other arm has a downwardly opening notch or slot for receiving and retaining the end of the latch member in a manner permitting quick engagement and detachment thereof. A spring means, indicated generally at 76 in Figure 2, encircles the pivot 74 and is operatively attached to the latch arm 72 and a yoke arm 76 in proper manner to urge the other end of the latch upwardly about its pivot 74. By this means, the latch is resiliently retained in its keeper or retaining slot, and when so positioned, securely holds down the free end of a fishing pole or similar rod.

From the foregoing, it is believed that the operation of this form of this invention will be readily apparent. Upon loosening of the wing nut 60 upon the stud 42, the swivel plates 48 and 40 may be relatively adjusted to rotate the rod support 56 in a horizontal plane, while the support 56 may be longitudinally and slidably adjusted in the channel 52, being laterally guided by the upstanding ribs or walls 54, to thereby vary the inclination of the rod to suit the convenience of the operator. The rod may be quickly and readily released when desired, by disengaging the latch 72 and lifting the rod upwardly from both of the yokes 64 and 66.

It will be understood that in some applications the telescopic expansible clamp, together with its advantages will not be necessary. In such situations, in order to provide a more economical construction, I may employ the form of clamp illustrated in Figures 8-10. In this embodiment, the clamp indicated generally at 110 may consist of a bight portion 112 having parallel, perpendicular, integral arm portions 114 and 116. As shown in Figures 8 and 9, the arm 114 is considerably longer than arm 116 and is centrally apertured at 118 for the reception of a shoulder bolt 120 and is provided with a plurality of angularly spaced depressions 122 adapted to receive a detent 124 carried by the swivelling member 126. The member 126 will preferably be similar in construction to the top plate 48 previously described, and slidably and guidingly supports the rod support 56 therein which is retained in adjusted position by the wing nut 60 in the manner set forth above. The shorter leg 116 is apertured to receive a thumb adjusting screw 128 which carries an arcuate pressure plate 130 adapted to cooperate with a pin 132 received in a bore 134 in the other arm 114. As illustrated best in Figure 9, the clamp is attached to a rail member 136 by seating the pin 132 in a suitable aperture or bore in the surface of the rail member, and with the clamp arms 114, 116 embracing the rail member, the thumb screw 128 is adjusted to securely mount the clamp upon the rail. The operation of the device is then identical with that of the embodiment described above.

Attention is now directed to Figures 8 and 10, showing a second method of employing the clamp of Figures 8, 9 and 10. In this use of the invention, the clamp 110 is shown applied to a rail 138 which is of substantially rectangular rather than of circular cross-section. For this purpose, the arms 114 and 116 are positioned to embrace the rail 138, while the bight portion 112 is adapted to mount the swivelling plate 126 and the rod support 56 thereon, in the same manner as in the foregoing example. As shown in Figure 8, the bight 112 is centrally apertured as at 142 for the reception of the square shouldered bolt 120 and is further apertured at 144 for the reception of the detent 124. The swivelling plate 126, and rod support 56 are adjustably mounted thereon as by a wing nut 60. The adjusting screw 128 and its pressure plate 140 are threaded through the arm 116 for the purpose of clamping the rail 138 between said plate and the longer arm 114.

The function of the clamps shown in Figures 8, 9 and 10 with the rest of the invention is identical with that of the first embodiment.

Since it will be apparent that the spirit of my invention may be employed in various constructions, I do not limit myself to the exact arrangements shown and described, but may avail myself of any suitable modifications falling within the scope of the appended claims.

I claim as my invention:

1. A fishing rod holder including a clamp, a swiveling joint secured to said clamp, a rod support secured to said joint, said rod support having an arcuate base axially adjustable upon said joint to vary the inclination of a rod supported thereby, said rod support having a yoke at each end thereof, one yoke supporting the butt of a rod and the other yoke having a quick detachable rod hold-down means, said hold-down means including a latch bar pivoted to one side of said other yoke and engageable with a keeper on the other side of said other yoke, said swiveling joint including a base plate detachably engaging said clamp, a top plate rotatably mounted on said base plate, cooperating depression and detent means between said plates for selectively retaining them in rotationally varied predetermined position, said detent means including a plurality of angularly spaced bores in said base plate and a projection depending from said top plate and selectively engageable with said bores.

2. A fishing rod holder including a clamp, a swiveling joint secured to said clamp, a rod support secured to said joint, said rod support having an arcuate base axially adjustable upon said joint to vary the inclination of a rod supported thereby, said rod support having a yoke at each end thereof, one yoke supporting the butt of a rod and the other yoke having a quick detachable rod hold-down means, said hold-down means including a latch bar pivoted to one side of said other yoke and engageable with a keeper on the other side of said other yoke, said clamp consisting of a pair of parallel jaws, said jaws being supported by laterally adjustable arms.

3. A fishing rod holder including a clamp, a swiveling joint secured to said clamp, a rod support secured to said joint, said rod support having an arcuate base axially adjustable upon said joint to vary the inclination of a rod supported thereby, said rod support having a yoke at each end thereof, one yoke supporting the butt of a rod and the other yoke having a quick detachable rod hold-down means, said hold-down means including a latch bar pivoted to one side of said other yoke and engageable with a keeper on the other side of said other yoke, said clamp consisting of a pair of parallel jaws, said jaws being supported by laterally adjustable arms, said arms including a pair of telescoping members.

4. A fishing rod holder including a clamp, a swiveling joint secured to said clamp, a rod support secured to said joint, said rod support having an arcuate base axially adjustable upon said joint to vary the inclination of a rod supported thereby, said rod support having a yoke at each end thereof, one yoke supporting the butt of a rod and the other yoke having a quick detachable rod hold-down means, said hold-down means including a latch bar pivoted to one side of said other yoke and engageable with a keeper on the other side of said other yoke, said clamp consisting of a pair of parallel jaws, said jaws being supported by laterally adjustable arms, said arms including a pair of telescoping members, said telescoping members having series of aligned apertures therein, and a retaining means insertable in said apertures for longitudinally adjusting said telescoping members.

PHILIP R. HART.

REFERENCES CITED

The following references are of record in the file of this patent:

UNITED STATES PATENTS

| Number | Name | Date |
|---|---|---|
| 2,179,896 | Neville | Nov. 14, 1939 |
| 2,184,583 | Danko | Dec. 26, 1939 |
| 2,220,234 | Hadaway | Nov. 5, 1940 |

FOREIGN PATENTS

| Number | Country | Date |
|---|---|---|
| 728,806 | France | Apr. 18, 1932 |